(12) United States Patent
Sethi et al.

(10) Patent No.: US 12,141,133 B2
(45) Date of Patent: Nov. 12, 2024

(54) SYSTEMS AND METHODS FOR ANALYZING REPORT INFRASTRUCTURE HEALTH

(71) Applicant: Capital One Services, LLC, McLean, VA (US)

(72) Inventors: Parul Sethi, Frisco, TX (US); Min Fang, Plano, TX (US); Wayne Zhen Yann Wong, Carrollton, TX (US); Christopher Kim, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 181 days.

(21) Appl. No.: 17/864,587

(22) Filed: Jul. 14, 2022

(65) Prior Publication Data

US 2024/0020301 A1 Jan. 18, 2024

(51) Int. Cl.
*G06F 16/242* (2019.01)
*G06F 16/22* (2019.01)
*G06F 16/2455* (2019.01)
*G06F 16/28* (2019.01)

(52) U.S. Cl.
CPC ...... *G06F 16/2433* (2019.01); *G06F 16/2282* (2019.01); *G06F 16/2455* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 6,609,123 B1* | 8/2003 | Cazemier | G06F 16/289 |
| 9,519,695 B2 | 12/2016 | Sampathkumaran et al. | |
| 10,235,439 B2 | 3/2019 | Sullivan et al. | |
| 2007/0150862 A1* | 6/2007 | Naibo | G06Q 10/10 717/110 |
| 2014/0279934 A1* | 9/2014 | Li | G06F 16/215 707/687 |
| 2021/0216521 A1* | 7/2021 | Jia | G06F 16/367 |
| 2022/0083529 A1* | 3/2022 | Jain | G06F 16/2358 |

FOREIGN PATENT DOCUMENTS

WO 2022011144 A1 1/2022

* cited by examiner

*Primary Examiner* — Taelor Kim
(74) *Attorney, Agent, or Firm* — TROUTMAN PEPPER HAMILTON SANDERS LLP; Christopher J. Forstner; John A. Morrissett

(57) ABSTRACT

The disclosed technology relates to analyzing report infrastructure health to determine based on lineage the downstream tables and reports that may be impacted by an infrastructure failure to thereby improve reporting accuracy. An exemplary report management device may extract database table names identified in SQL queries. The SQL queries and report metadata are analyzed to identify driver and required tables, respectively. The database table names are stored in a table inventory and the database table names associated with one of the driver or required tables is marked. For each of the SQL queries comprising a target table, elements and source table names are extracted for source tables of the target table and an association is stored. Lineage data is generated based on the association when the report was not executed successfully. A graphical representation of the report lineage including a failed table and associated source table(s) is then output.

20 Claims, 7 Drawing Sheets

SYSTEMS AND METHODS FOR ANALYZING
REPORT INFRASTRUCTURE HEALTH

FIELD

The disclosed technology relates to systems and methods for analyzing databases and reporting infrastructure and more particularly to more efficient and effective infrastructure analysis that leverages database table lineage to inform developers and other users regarding report status to improve report accuracy and facilitate more efficient infrastructure repair.

BACKGROUND

Business intelligence reporting infrastructure is increasingly complex with numerous data and query repositories as well as distributed databases with interrelationships and complicated table lineage. As a result, reports often fail yielding inaccurate or stale data, which may not be apparent to report consumers. When report consumers are aware of a report that has not been updated, the consumers generally engage technical representatives. However, troubleshooting and repairing report infrastructure following a failure is difficult and time-consuming in part because contextual data regarding the failure is generally unavailable and/or resource-intensive to obtain, resulting in delayed and/or inaccurate failure reporting.

As one example, it is currently challenging to determine whether there was a load issue or a source table failure. Additionally, it is difficult to identify the downstream reports that may be impacted by a particular failure so that associated report consumers can be informed proactively or following an attempt to retrieve or generate a report, for example. Even when impacted reports can be identified, it is difficult to determine whether the particular failure is consequential with respect to report accuracy. For example, some reports may be sufficiently accurate even if particular source data has not been refreshed for a certain time period (e.g., in the last 24 hours). Additionally, report consumers are currently unable to determine with confidence when data and/or reports will be refreshed following a failure.

BRIEF SUMMARY

Examples of the present disclosure provide solutions to issues associated with reporting infrastructure for business intelligence and other metrics. This technology advantages analyzes database queries to construct a database table inventory that includes a lineage of tables as well as an indication of driver and other required tables. The database table inventory can be leveraged to determine report accuracy and facilitate more efficient troubleshooting and repair, for example. This technology also generates improved estimates for the repair time for failures based on failure type, historical repair data, and/or machine learning, for example. Additionally, this technology provides an improved graphical user interface that allows report consumers to generate reports, initiate report health checks, and obtain lineage data and failure information, among other features.

In some examples the disclosed technology includes a report management device that includes a processor and memory in communication with the processor and storing instructions that, when executed by the processor, are configured to cause the report management device to perform one or more methods. For example, the report management device may extract a database table name for each of a plurality of database tables identified in a plurality of structured query language (SQL) queries defined in report data maintained in a stored repository. The SQL queries are configured to communicate with one or more stored databases to facilitate generation of a report. Each of the SQL queries is then analyzed along with report metadata maintained in the stored repository to identify one or more driver tables and one or more required tables of the plurality of database tables, respectively. The database table names are stored in a table inventory and each of the database table names associated with one of the driver tables or one of the required tables is marked in the table inventory as required to be current for report accuracy. For each of the SQL queries comprising a target table, one or more elements and one or more source table names for one or more source tables of the target table are extracted. An association of the elements and source table names with a first one of the database table names corresponding to the target table is stored in the table inventory. Lineage data is generated based on the association in the table inventory when the report was not executed successfully in response to a request to generate the report. A user interface with a graphical representation of a lineage of the report determined from the lineage data is then generated and output. The graphical representation comprises an indication of a failed table of the plurality of database tables and one or more of the source tables for the failed table.

The disclosed technology includes another report management device that includes a processor and memory in communication with the processor and storing instructions that, when executed by the processor, are configured to cause the report management device to perform one or more methods. For example, the report management device may extract a database table name for each of a plurality of database tables identified in a plurality of SQL queries retrieved from stored report data, wherein the SQL queries facilitate generation of a report. Each of the SQL queries is analyzed along with obtained report metadata to identify one or more driver tables and one or more required tables of the plurality of database tables, respectively. The database table names are stored in a table inventory and each of the database table names associated with one of the driver tables or one of the required tables is marked in the table inventory. For each of the SQL queries comprising a target table, one or more elements and one or more source table names are extracted. An association of the elements and source table names with one of the database table names corresponding to the target table is stored in the table inventory. Lineage data is generated based on the association of the elements and source table names with the one of the database table names corresponding to the target table in response to determining that the report was not executed successfully. A graphical representation of a lineage of the report determined from the lineage data is generated and output. The graphical representation comprises an indication of a failed table of the plurality of database tables.

The disclosed technology includes yet another report management device that includes a processor and memory in communication with the processor and storing instructions that, when executed by the processor, are configured to cause the report management device to perform one or more methods. For example, the report management device may extract a database table name for each of a plurality of database tables identified in a plurality of SQL queries that facilitate generation of a report. Each of the SQL queries is analyzed to identify one or more driver tables of the plurality of database tables. Each of the database table names associated with one of the driver tables is marked in a table inventory. For each of the SQL queries comprising a target table of the plurality of database tables, one or more source table names are extracted. An association of the source table names with a first one of the database table names corresponding to the target table is stored in the table inventory. Lineage data is generated based on the association of the source table names with the first one of the database table names in response to determining that the report was not executed successfully based on an obtained report status for the report. For each of the plurality of database tables for which an obtained load status indicates a failure to load, a corresponding second one of the database table names is marked in the table inventory as failed. A graphical representation of a lineage of the report determined from the lineage data is then output. The graphical representation comprises an indication of a failed table of the plurality of database tables generated based on the marking in the table inventory of the corresponding second one of the database table names as failed.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Figure 1:
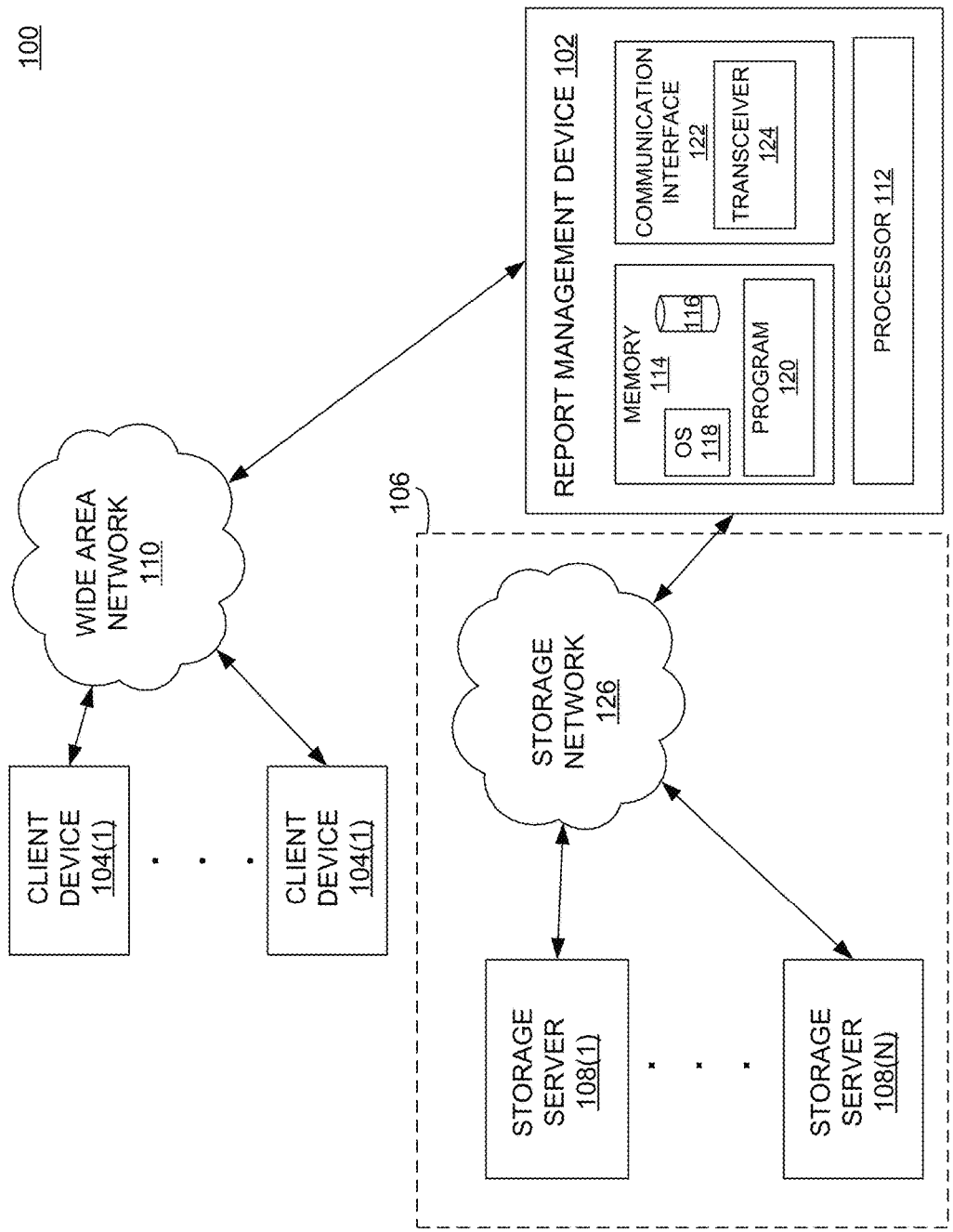
FIG. 1 is a block diagram of an example system environment that includes client devices, a report management device, and a backend infrastructure with storage servers, in accordance with one or more examples of the disclosed technology.

Examples of the disclosed technology may be utilized to improve enterprise report generation and infrastructure, and provide an improved user interface for displaying report failure information including database table lineage data. In some examples, a report management device 102 periodically analyzes structured query language (SQL) queries associated with various reports to populate a database table inventory that identifies driver and required tables and facilitates determination of table lineage. Driver tables that are required to be current for report accuracy are automatically identified and marked in the database table inventory based on the SQL query analysis to inform whether a report should be displayed or identified as failed.

In addition to the periodic analysis to generate the database table inventory, the report management device 102 in some examples performs a health check by interrogating report infrastructure for status information, for example. When the health check is triggered following a request for a report, the report management device 102 can analyze obtained status information to determine whether any tables or metrics, for example, have failed, and whether the report should therefore be failed. When a report is determined to have failed, the report management device 102 advantageously generates database table lineage data to allow a report consumer and/or developer to determine the cause and extent of the failure. Based on the table lineage data and other factors, the report management device 102 can also determine, and output via a provided user interface, an indication of the failure and/or an estimate repair time at which the report will be accurate and available.

As will be described and illustrated in more detail below, by leveraging a report management device 102, this technology improves report accuracy, infrastructure analysis and repair, and failure reporting, for example. Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 is a block diagram of an example system environment 100 that includes a client devices 104(1)-104(n), a metric management device 102, and backend infrastructure 106 with storage servers 108(1)-108(n), in accordance with one or more examples of the disclosed technology. The client devices 104(1)-104(n), metric management device 102, and storage servers 108(1)-108(n) are coupled together via one or more wide area networks (WANs) 110, for example.

Each of the client devices 104(1)-104(n) can be a mobile computing devices (e.g., a smart phone, tablet computer, smart wearable (e.g., a smart watch), portable laptop computer, voice command device, wearable augmented reality device, or other mobile computing device) or a stationary device (e.g., desktop computer), for example. The client devices 104(1)-104(n) hosts a web browser application in this particular example, which provides an interface to exchange information (e.g., requests to establish new reports, initiate health checks, etc.) with the storage servers 108(1)-108(n) and/or the report management device 102, although other methods of communicating between those devices can also be used.

The report management device 102 can interface with the client devices 104(1)-104(n) to provide reports and report failure information, and to respond to other types of client queries, for example. The report management device 102 can also interface with the storage servers 108(1)-108(n) to obtain and analyze SQL queries, report metadata, database table information, and load statuses, for example. The report management device 102 can include a processor 112, memory 114, and data storage 116. The processor 112 can include one or more of a microprocessor, microcontroller, digital signal processor, co-processor or the like or combinations thereof capable of executing stored instructions and operating upon stored data.

The memory 114 of the report management device 102 can include, in some implementations, one or more suitable types of memory (e.g., volatile or non-volatile memory, random access memory (RAM), read only memory (ROM), magnetic disks, optical disks, hard disks, flash memory, solid state drives, non-transitory computer-readable medium, and the like), for storing files and/or applications (e.g., a web browser application, a widget or gadget engine, and or other applications, as necessary), executable instructions and data.

The memory 114 can contain an operating system (OS) 118 that can run program(s) 120. The program(s) 120 can perform one or more functions of the disclosed examples, such as explained in detail below with reference to FIGS. 2-7. The report management device 102 can also include a communication interface 122 for communicating with external systems or internal systems. The communication interface 122 can include a transceiver 124 to communicate with compatible devices, for example via short range, long range, or similar technologies that enables the report management device 102 to communicate via the WAN 110 described herein.

The storage servers 108(1)-108(n) of the backend infrastructure 106 are coupled together via a communication network 126, which can include local or wide area networks, for example. The storage servers 108(1)-108(n) can host databases and report information, for example, and can communicate with the report management device 102 to provide report, table, and/or metric statuses and report metadata, such as associated SQL queries and required tables, for example.

Accordingly, each of the storage servers 108(1)-108(n) can include a processor, memory, and data storage. The processor can include one or more of a microprocessor, microcontroller, digital signal processor, co-processor or the like or combinations thereof capable of executing stored instructions and operating upon stored data.

The memory can include one or more suitable types of memory (e.g., volatile or non-volatile memory, RAM, ROM, magnetic disks, optical disks, hard disks, removable cartridges, flash memory, solid state drives, non-transitory computer-readable medium, and the like), for storing files and/or application, executable instructions, and data. The memory can contain an OS that can run program(s). The memory 114 can also include any combination of one or more databases controlled by memory controller devices (e.g., server(s), etc.) or software, such as document management systems, Microsoft® SQL databases, SharePoint® databases, Oracle® databases, Sybase® databases, or other relational databases.

The storage servers 108(1)-108(n) can also include a communication interface for communicating with external systems or internal systems. The communication interface can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface can include a transceiver to communicate with compatible devices, for example via short range, long range, or similar technologies that enables the storage servers to communicate via the communication network 126 and WAN 110 described herein.

Figure 2:
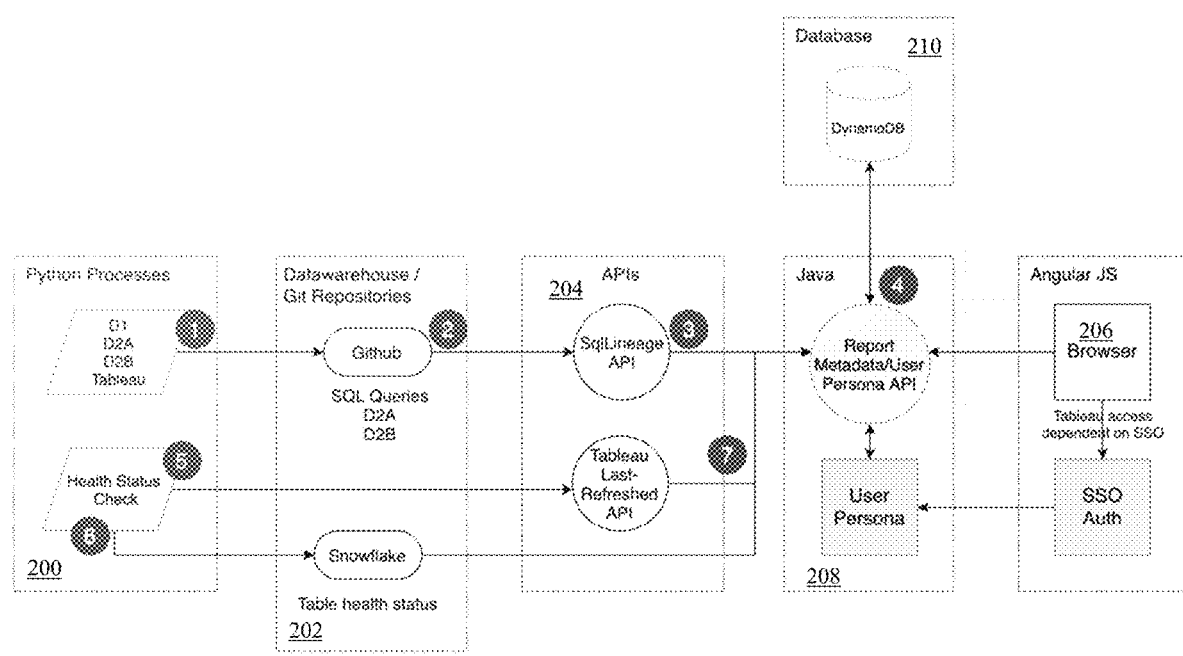
FIG. 2 is a flow diagram illustrating exemplary interfaces and data exchanges of components of the devices of the exemplary system environment of FIG. 1, in accordance with one or more examples of the disclosed technology.

FIG. 2 is a flow diagram illustrating exemplary interfaces and data exchanges of components of the devices of the exemplary system environment 100 of FIG. 1, in accordance with one or more examples of the disclosed technology. In this example, the report management device 102 can house processes 200 (e.g., Python processes) that perform tasks or jobs (referred to in FIG. 2 as D1, D2A, D2B, and Tableau) associated with generating metrics or reports on behalf of a report consumer associated with an enterprise, for example. Those jobs that form part of the processes 200 can communicate with data warehouses 202 to leverage SQL queries, for example, associated with the reports, which may be maintained in a Github repository of the data warehouses 202.

The APIs 204 can have endpoints hosted by one or more of the storage servers 108(1)-108(n), for example, and can perform particular tasks. For example, the APIs 204 can include a SqlLineage API that is configured to generate and/or analyze a database table inventory to provide lineage data that reflects the interrelationships of database tables that are utilized to generate enterprise reports. The SqlLineage API can be called to determine whether a table failure impacts a particular report and/or to generate data useful for developers for repairing report infrastructure.

To initiate a report, a browser 206 executed by one of the client devices 104(1)-104(n) can interface with a dynamic frontend portal or graphical user interface (GUI) implemented in Angular JavaScript (JS), for example. Following authentication and/or user persona determination, the request initiated at the browser 206 can be received (e.g., at an API) by Java 208 executed at the report management device 104, for example. The Java can leverage the database 210 (e.g., a DynamoDB database), which can be hosted by one of the storage servers 108(1)-108(n), for example, to retrieve metadata associated with a report, including required tables, which was previously received and stored when the report was defined by a report consumer or developer, for example.

The Java 208 can then initiate a health status check task of the processes 200, which is configured to communicate with the APIs 204 and the data warehouses 202 to generate and provide health data to the report management device 102. Specifically, the health status check task of the processes 200 is configured to use an API (e.g., a last-refreshed API provided by Tableau business intelligence and data visualization infrastructure) to determine whether reports are refreshed and data extracts are occurring as expected and to query a database (e.g., a cloud-based data warehouse such as may be hosted by Snowflake) to determine status data for tables, for example. With the health data obtained from the processes 200, and the report metadata retrieved from the database 210, the report management device 102 can then generate an interface with failure data in the event the report has failed. The failure data can include lineage data and estimate repair time, along with additional contextual information described and illustrated in more detail below with reference to FIGS. 5-7.

Figure 3:
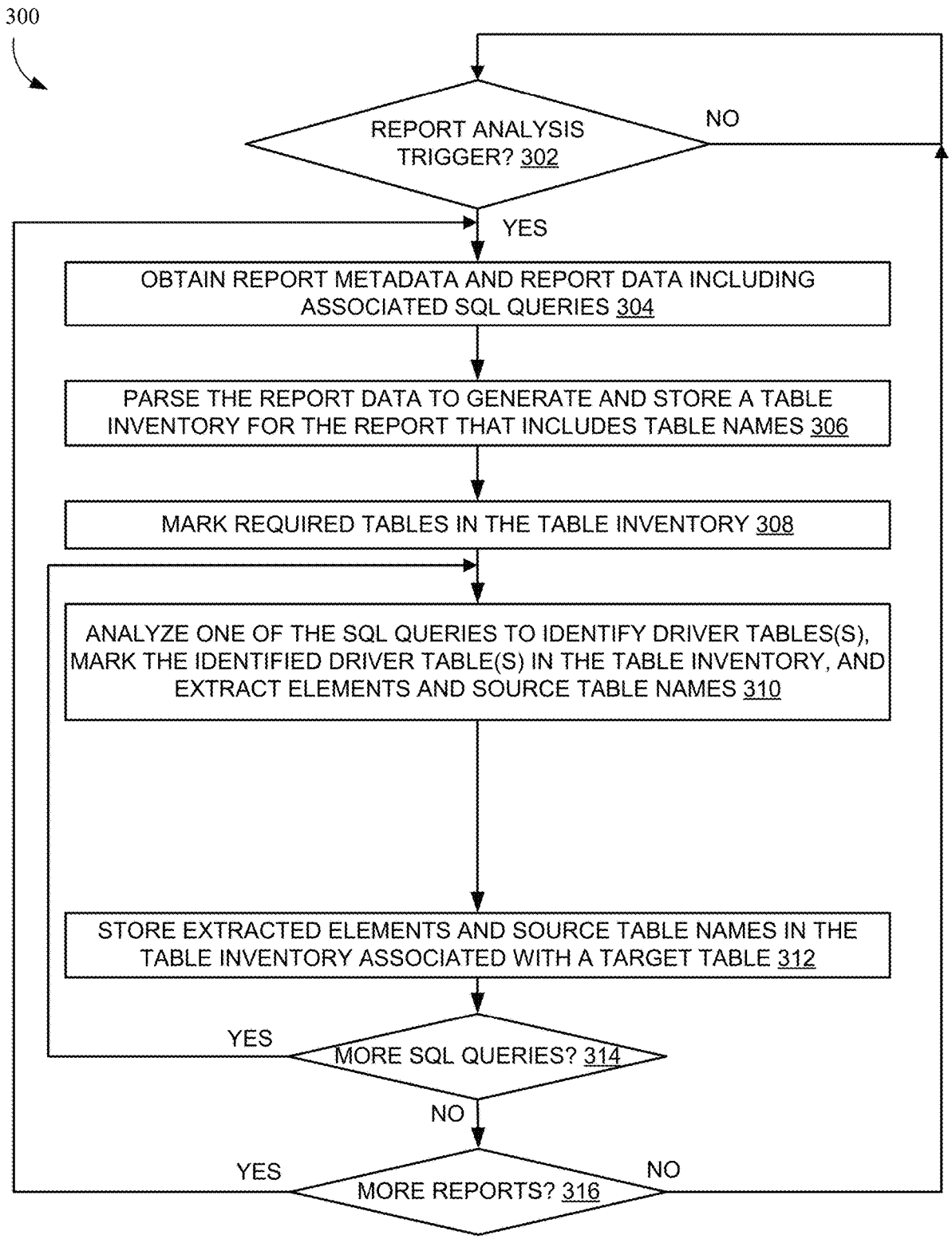
FIG. 3 is a flow diagram of an example method for analyzing stored report data to populate a database table inventory that facilitates generation of lineage data, in accordance with one or more examples of the disclosed technology.

FIG. 3 is a flow diagram of an example method 300 for analyzing stored report data to populate a database table inventory that facilitates generation of lineage data, in accordance with one or more examples of the disclosed technology. In block 302, the report management device 102 determines whether a report analysis trigger is initiated. In some examples, report(s) can be analyzed periodically (e.g., daily), although analysis for other report(s) can also be manually triggered, such as aby a user of one of the client devices 104(1)-104(n), for example. If the report management device 102 determines that a report analysis trigger has not been initiated, then the No branch is taken back to block 302 and the report management device 102 effectively waits for an analysis of a report to be triggered. However, if the report management device 102 determines that a report analysis has been triggered, then the Yes branch is taken from block 302 to block 304.

In block 304, the report management device 102 obtains (e.g., from the database 210) report metadata and report data including SQL queries associated with the report for which an analysis was triggered. The report metadata can include a report name, parameters regarding refresh and/or health check frequency, for example, and an indication of particular database tables that are required to be current or updated in order for the report to be considered accurate. Accordingly, the required tables are identified by a user or developer that generated and stored the report.

The SQL queries are configured to communicate with one or more stored databases to facilitate generation of a report can collectively establish the various data (e.g., maintained in database(s) in the data warehouse 202) required to generate the various metric(s) or other values associated with the report. Other types of report metadata and/or report data can be stored and/or obtained in block 304.

In block 306, the report management device 102 parses the report data to generate and store a table inventory for the report that includes table names. The table inventory in this example includes an indication (i.e., table name) for all tables encountered by parsing the SQL queries in the report data obtained in block 304. The table inventory can be a NoSQL database in some examples, although other storage structures can also be used.

In block 308, the report management device 102 marks the required tables in the table inventory with an indication that the associated tables names correspond with a table that contains data required for the accuracy of the associated report. The required tables are referenced in the report metadata obtained in block 304 and are identified by a user or developer that generated the report.

In block 310, the report management device 102 analyzes one of the SQL queries in the report data to identify driver table(s), marks the identified driver table(s) in the table inventory, and extracts elements and source table names for target tables. The driver table(s) are tables containing data required for report accuracy that are automatically identified by the report management device. The extracted information facilitates generation of lineage data as explained in more detail below.

Figure 4:
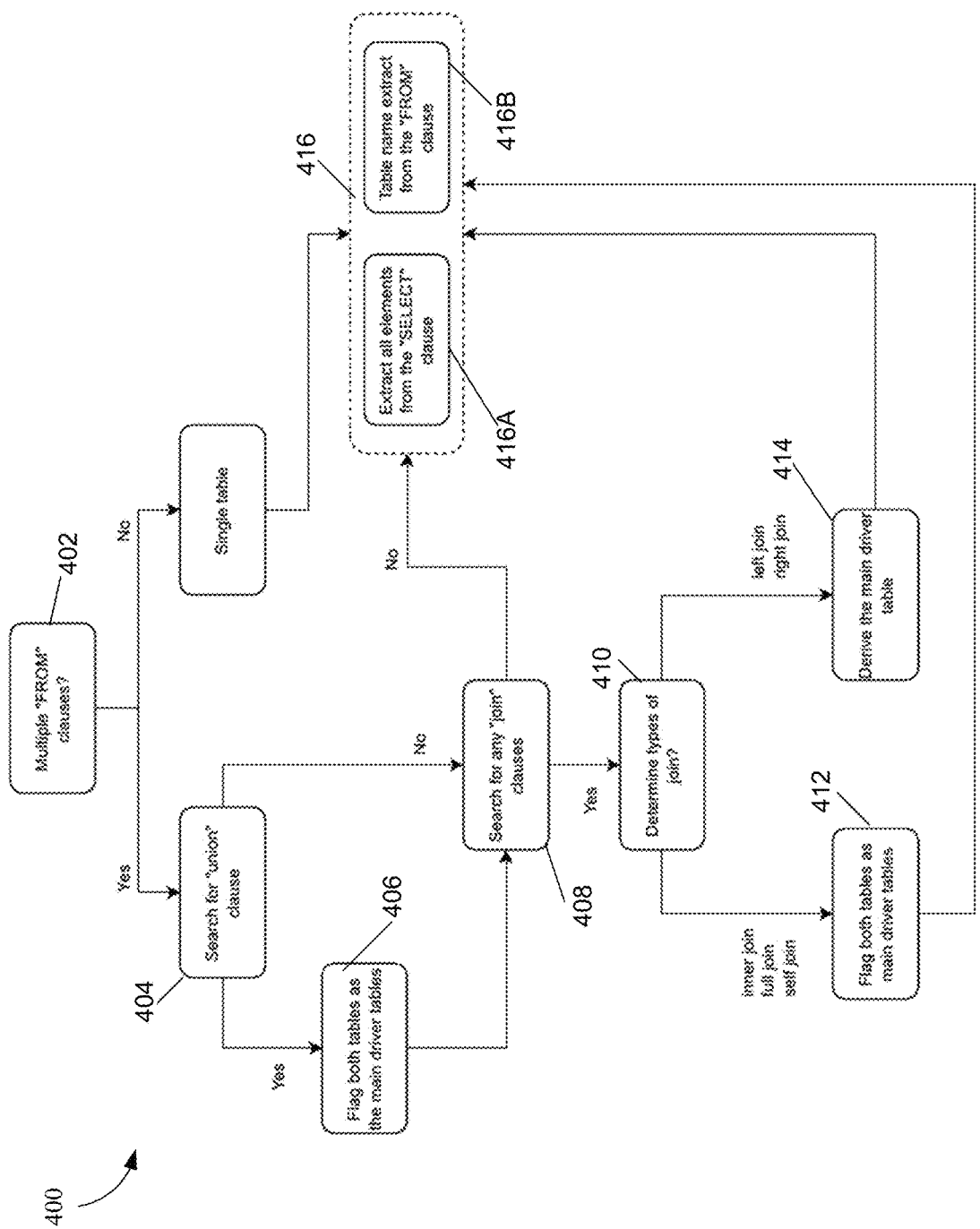
FIG. 4 is a flow diagram of an example method for analyzing database queries to identify driver tables and extract associated data, in accordance with one or more examples of the disclosed technology.

FIG. 4 is a flow diagram of an example method 400 for analyzing database queries to identify driver tables and extract associated data, in accordance with one or more exemplary implementations of block 310 of FIG. 3. In block 402, the report management device 102 parses the one of the SQL queries to determine whether the SQL query has multiple FROM clauses. If the report management device 102 determines that the SQL query has multiple FROM clauses, then the Yes branch is taken to block 404.

In block 404, the report management device 102 parses the SQL query to determine whether the SQL query includes at least one UNION clause. If the report management device 102 determines that the SQL query includes a UNION clause, then the Yes branch is taken to block 406.

In block 406, the report management device 102 flags both tables associated with the UNION clause as driver tables by marking the tables in the table inventory accordingly based on the associated table names. However, if the report management device 102 determines in block 404 that the SQL query does not include a UNION clause, then the No branch is taken to block 408.

In block 408, the report management device 102 parses the SQL query to determine whether the SQL query includes at least one JOIN clause. If the report management device 102 determines that the SQL query includes a JOIN clause, then the Yes branch is taken to block 410.

In block 410, the report management device 102 identifies the type of the JOIN clause based on an indication of the type following the JOIN clause in the SQL query. In this example, the JOIN clause type can be an inner, full, self, left, or right JOIN, although other types of JOIN clauses can be used in other examples. If the report management device 102 identifies an inner, full, or self JOIN clause in this particular examples, then the report management device 102 proceeds to block 412.

In block 412, the report management device 102 flags both tables associated with the JOIN clause as driver tables by marking the tables in the table inventory accordingly based on the associated table names. However, if the report management device 102 determines in block 410 that the SQL query includes a left or right JOIN clause in this particular example, then the report management device 102 proceeds to block 414.

In block 414, the report management device 102 derives a driver table from the tables associated with the JOIN clause. In one example, the report management device 102 can select one of the tables based on one or more characteristics of the left or right JOIN clause, for example. Subsequent to deriving the driver table in block 414, flagging both tables as driver tables in block 412, determining in block 408 that the SQL query does not include any JOIN clauses, or determining that the SQL query does not include multiple FROM clauses in block 402, then the report management device 102 proceeds to block 416.

In block 416, the report management device 102 extracts elements and source table names. In particular, in block 416A, the report management device 102 extracts all elements from SELECT clauses of the SQL query. The elements correspond to table columns in this example. Additionally, in block 416B, the report management device 102 extracts source table names from the FROM clause(s). Accordingly, following method 400, the report management device will have marked the driver tables of the SQL clause in the table inventory and extracted elements and source table names from the SQL query.

Referring back to FIG. 3, in block 312, the report management device 102 stores the extracted elements and source table names in the table inventory associated with a target table identified in the SQL query. In some examples, the SQL query is configured to retrieve data from particular columns of particular source tables and place the retrieved data into a target table. Accordingly, the report management device 102 stores in the table inventory an association of the elements (e.g., columns) and source table names with the table name of the target table, which was inserted into the table inventory as described above with reference to block 306. One or more of the source table names may have been previously flagged as a driver table in the table inventory, as explained above with reference to block 310, or a required table, as explained above with reference to block 308.

In block 314, the report management device 102 determines whether there are more SQL queries associated with the report. If the report management device 102 determines there is at least one additional SQL query associated with the report, then the Yes branch is taken back to block 310, and blocks 310-312 are repeated for each of the SQL queries associated with the report. However, if the report management device 102 determines in block 314 that there are no more SQL queries associated with the report, then the No branch is taken to block 316.

In block 316, the report management device 102 determines whether there are more reports for which an analysis was triggered in block 402. If the report management device 102 determines that there is at least one more report for which an analysis was triggered, then the Yes branch is taken back to block 304 and blocks 304-314 are repeated for each of the reports for which an analysis was triggered. However, if the report management device 102 determines in block 316 that there are no more reports for which an analysis was triggered, then the No branch is taken back to block 302.

Figure 5:
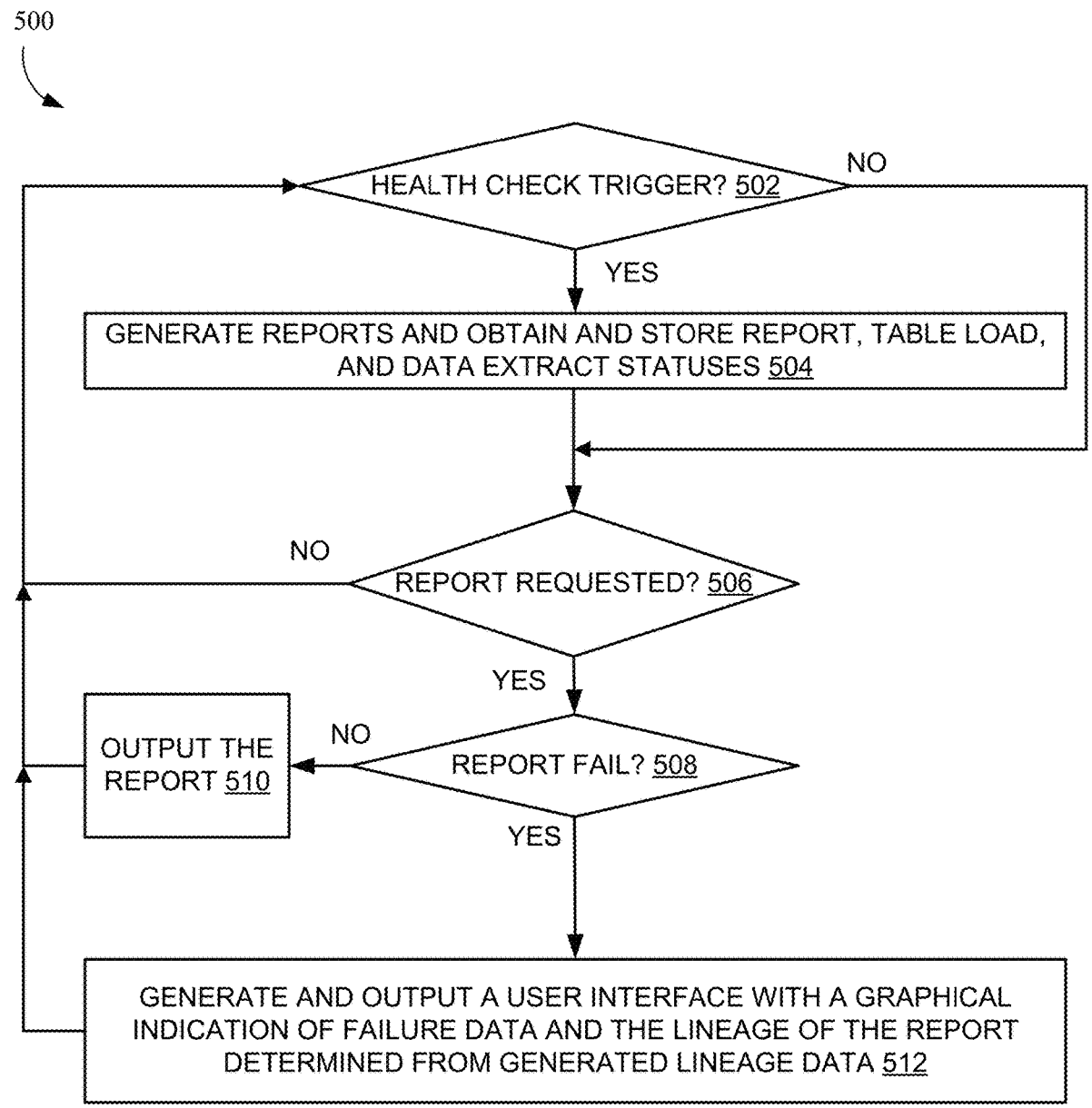
FIG. 5 is a flow diagram of an example method for checking reporting infrastructure health and generating an interface to provide lineage data and other report failure information, in accordance with one or more examples of the disclosed technology.

FIG. 5 is a flow diagram of an example method 500 for checking reporting infrastructure health and generating an interface to provide lineage data and other report failure information, in accordance with one or more examples of the disclosed technology. In block 502, the report management device 102 determines whether a health check is triggered for a report. A health check can be triggered automatically based on a defined periodic schedule, automatically following a request for a report, or manually, such as by a user of one of the client devices 104(1)-104(n), for example. If the report management device 102 determines that a health check is triggered for a report, then the Yes branch is taken to block 504.

In block 504, the report management device 102 attempts to generate each of the reports and obtains and stores report, table load, and data extract statuses. In some examples, the table load status can be retrieved from the data warehouse 202 (e.g., Snowflake cloud data platform) and the extract load status (also referred to herein as a metric generation status) can be retrieved from one of the APIs 204 (e.g., a Tableau analytics infrastructure API), although other methods for determining table load and/or data extract statuses can also be used in other examples. Optionally, the table load status can be retrieved for all tables identified in the table inventory.

In this example, each of the reports is executed periodically (e.g., daily). To generate the report, the report management device 102 can execute all of the SQL queries associated with the report, and included in report data retrieved and stored as described and illustrated in more detail above, in order to obtain the data and metrics that correspond with the report. If the report is unable to be generated successfully, the report management device 102 can store an indication of the report failure and, otherwise, an indication of the report success. The statuses obtained in block 504 can be stored in the database 210 and/or memory 114, for example. Subsequent to obtaining and storing the statuses in block 504, or if the report management device 102 determines that a health check has not currently been triggered and the No branch is taken from block 502, then the report management device 102 proceeds to block 506.

In block 506, the report management device 102 determines whether a report has been requested. The report can be requested via a graphical user interface (GUI) provided by the report management device 102 to a requesting one of the client devices 104(1)-104(n), for example. If the report management device 102 determines that a report has not been requested, then the No branch is taken back to block 502 and the report management device effectively waits for a health check trigger or report request. However, if the report management device 102 determines that a report has been requested, then the Yes branch is taken to block 508.

In block 508, the report management device 102 determines whether the requested report has failed. The determination in block 508 can be based on the report status obtained and stored in block 504, for example. If the report management device 102 determines in block 508 that the report has not failed, then the No branch is taken to block 510.

In block 510, the report management device 102 outputs the report, such as via the provided GUI, for example. However, if the report management device 102 determines in block 508 that the requested report has failed, then the Yes branch is taken to block 512.

In block 512, the report management device 102 generates and outputs a GUI with an indication of failure data and lineage of the report determined from generate lineage data. The report management device 102 in this example generates lineage data based on the association of source table names with target table names in the table inventory (e.g., as stored as described and illustrated in more detail above with reference to block 312 of FIG. 3). Accordingly, the report management device 102 can recursively traverse the table inventory to generate the lineage data.

Accordingly, in examples in which the report failed because of a failure for a database table to load, as determined from the table load status obtained and stored in block 504, for example, the GUI can include an indication of the failed table and one or more of the source tables for the failed table. While the lineage in the examples described and illustrated herein is at a table level, the lineage can also be based on a column level in other examples according to stored association in the table inventory of the elements with the target table. Thus, in these examples, users can visualize the particular reason for the failure, including a downstream table that may be relied upon to generate a table directly used to generate the failed report.

Optionally, in some examples, the report management device 102 can output via the user interface a failure message indicating a cause of a failure of the report to execute successfully and/or an indication of an estimated restoration time. The estimated restoration time can be determined based on the lineage data, input received from a subject matter expert, logged data regarding historical failures, and/or whether the report was not executed successfully due an internal or external failure, although other factors can also impact the estimated restoration time in other examples. For example, if the lineage data indicates that a table that failed to load is relied on to populate a significant number of other tables, the restoration time may be longer because all of those tables may need to be refreshed. Subsequent to outputting the GUI in block 512 or the report in block 510, the report management device 102 proceeds back to block 502 in this example.

Figure 6:
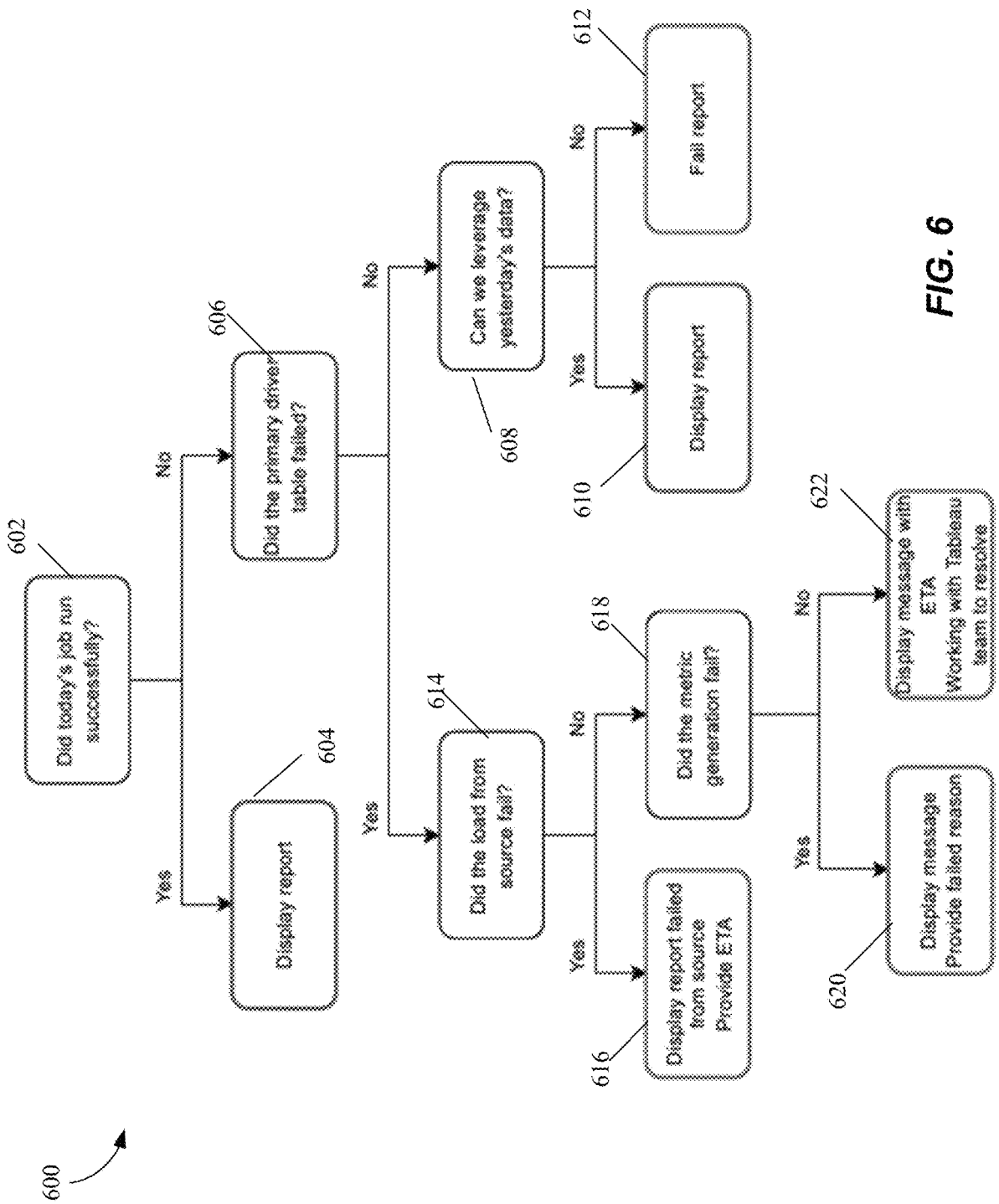
FIG. 6 is a flow diagram of an example method for determining whether a report has failed, and selectively presenting reports and failure information, in accordance with one or more examples of the disclosed technology.

FIG. 6 is a flow diagram of an example method 600 for determining whether a report has failed, and selectively presenting reports and failure information, in accordance with one or more examples of the disclosed technology. In block 602, the report management device 102 determines whether a job associated with the report has run successfully. If the report management device 102 determines that the job ran successfully, then the Yes branch is taken to block 604 and the report management device 102 displays the report, such as described above with reference to block 510 of FIG. 5, for example. However, if the report management device 102 determines that the job did not run successfully, then the No branch is taken to block 606.

In block 606, the report management device 102 determines whether a driver table failed. The determination in block 606 can be based on the marking of table(s) as driver tables as described above with reference to block 310 of FIG. 3 and the table load statuses obtained and stored as described above with reference to block 504 of FIG. 5, for example. If the report management device 102 determines that the failure of the job to run successfully was not due to a failure of a driver table, then the No branch is taken to block 608.

In block 608, the report management device 102 determines whether prior data (e.g., as generated on the previous day for reports that are run daily) can be leveraged or used in the generation of the report. In some examples, the stale data can be used because the data of the particular table does not change often or daily, or is not particularly important or impactful with respect to the report, for example, as determined by an author of the report. In some examples, the determination in block 608 is based on the marking in the table inventory of required tables described above with reference to block 308 of FIG. 3 and the table load statuses obtained and stored as described above with reference to block 504 of FIG. 5, for example. Accordingly, if the table that failed was not a required table in this example, then the stale data can be leveraged.

If the report management device 102 determines that the stale data can be leveraged, then the Yes branch is taken to block 610 and the report management device 102 displays the report as described above with reference to block 604 and block 510 of FIG. 5. However, if the report management device 102 determines that the stale data cannot be leveraged, then the No branch is taken to block 612 and the report is determined to have failed (e.g., for purposes of the condition described and illustrated above with reference to block 508 of FIG. 5). Referring back to block 606, if the report management device 102 determines that the failure of the job was due to a failure of a driver table, then the Yes branch is taken to block 614.

In block 614, the report management device 102 determines whether a source failure has occurred. A source failure in this example is identified based on an analysis of the lineage data and the table load statuses obtained and stored as described above with reference to block 504 of FIG. 5. Accordingly, if a downstream source table for a table used by the current report failed, then the condition in block 614 is satisfied. If the report management device 102 determines that a source failure has occurred, then the Yes branch is taken to block 616.

In block 616, the report management device 102 outputs the GUI with an indication of the failed table and the associated lineage, optionally along with an estimated restoration time. However, if the report management device 102 determines in block 614 that a source failure has not occurred, then the No branch is taken to block 618.

In block 618, the report management device 102 determines whether a metric generation failure has occurred. The metric generation failure in this example is identified based on an analysis of the data extract statuses obtained and stored as described above with reference to block 504 of FIG. 5. If the report management device 102 determines that a metric generation failure has occurred, then the Yes branch is taken to block 620.

In block 620, the report management device 102 outputs the GUI with a failure message and a reason for the failure relating to the inability for data extracts to happen as expected. However, if the report management device 102 determines in block 618 that a metric generation failure has not occurred, then the No branch is taken to block 622.

In block 622, the report management device 102 outputs the GUI with a failure message and optionally an indication of an estimated restoration time. Optionally, the report management device 102 can also be configured to receive feedback data regarding the restoration time once the failure is resolved, which can be used to train a machine leaning model for subsequent determinations of estimated restoration times.

One or more of methods 300, 400, 500, and/or 600 may be performed by the report management device 102, which includes the processor 112 and memory 114 in communication with the processor 112 and storing instructions. When executed by the processor 112, the stored instructions cause the report management device 102 to perform certain functions, such as one or more steps described and illustrated herein with reference to methods 300, 400, 500, and/or 600. Additionally, one or more steps of one or more of methods 300, 400, 500, and/or 600 can be performed in a parallel and/or in a different order than as described above and illustrated in FIGS. 3-6.

As described and illustrated by way of the examples herein, this technology advantageously provides a technical improvement to business intelligence and analytics reporting infrastructure. Specifically, this technology more effectively informs report consumers regarding report failures and, via lineage data, facilitates more efficient restoration of infrastructure functionality by technical representatives. Accordingly, this technology provides a more effective understanding of the impact of a database table or other failure on downstream reports, among other advantages.

Example Use Case

Figure 7:
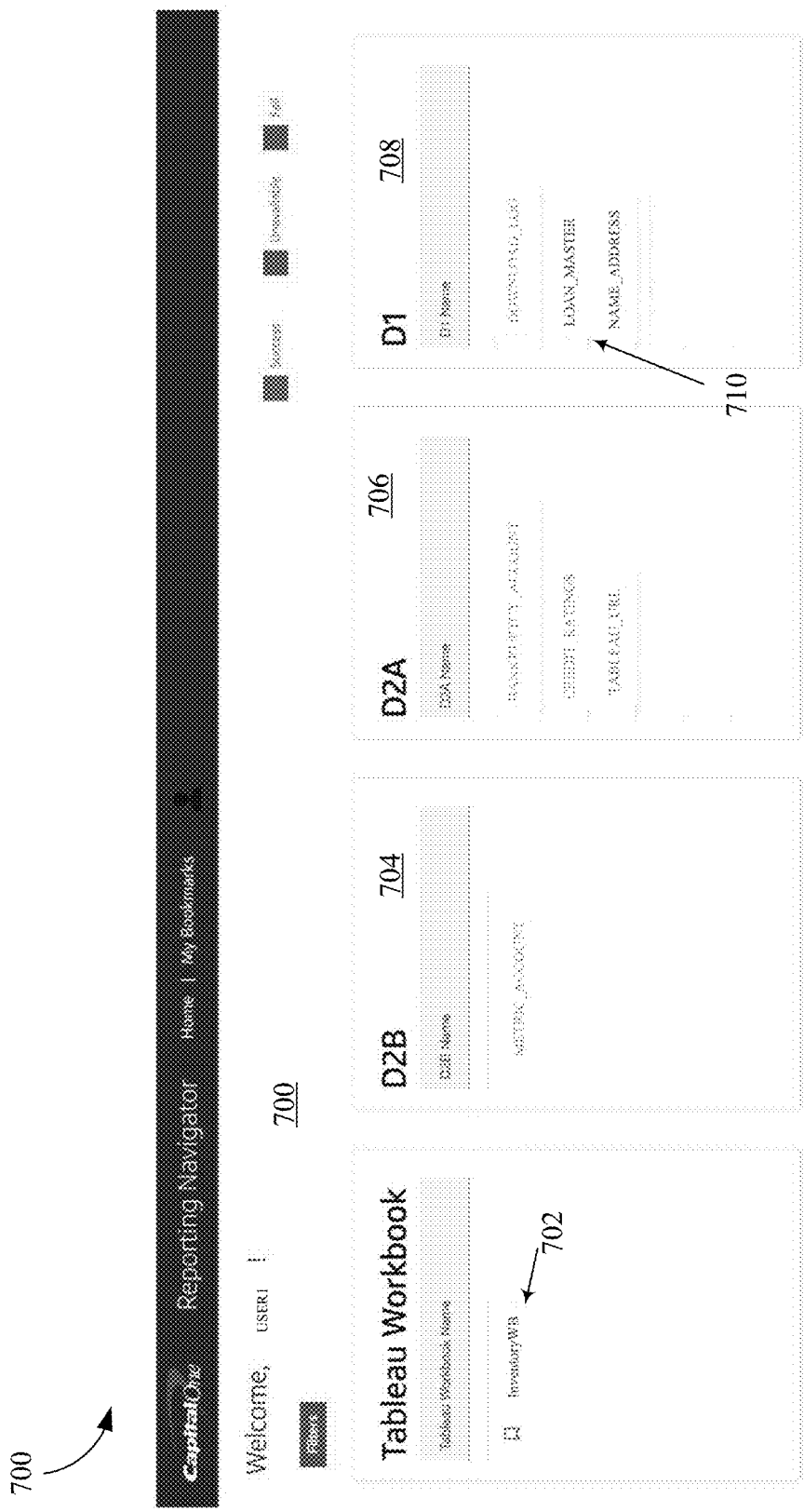
FIG. 7 is a screenshot of an example interface that includes lineage data and other report failure information, in accordance with one or more examples of the disclosed technology.

The following example use case describes an example of a typical user flow pattern. This section is intended solely for explanatory purposes and not in limitation. In this particular examples, a user can login to the report management device 102 to see a dashboard relating to reports predefined (e.g., via a persona) to be associated with the user (e.g., via an assigned login or username) In response to the login, the report management device can output a GUI and FIG. 7 is a screenshot of an example interface or GUI 700 that includes lineage data and other report failure information, in accordance with one or more examples of the disclosed technology.

In this example, the user (e.g., of one of the client devices 104(1)-104(n)) can immediately determine that the "InventoryWB" report 702 has failed and is therefore unreliable based on its red coloring, although other graphical indicia can also be used. The "D2B" job 704, "D2A" job 706, and "D1" job 708 are also identified in the GUI 700 in this example. The "D2B" job 704, "D2A" job 706, and/or "D1" job 708 can generate intermediary metrics to facilitate or inform the "InventoryWB" report 702 or one or more of the "D2B" job 704, "D2A" job 706, and/or "D1" job 708 can be intermediary SQL queries that generate target tables from multiple source tables, and other types of jobs can also be used and/or illustrated in the GUI 700 in other examples.

In this particular example, the "D1" job 708 identifies a set of six database tables, the first three of which are a green color, and the second three of which are identified by a red color indicating that those tables have failed, which resulted in the failure of the downstream "InventoryWB" report 702. The indication of the "LOAN_MASTER" table 710 as failed can be based on lineage data generated as described and illustrated above, including with reference to block 512 of FIG. 5. Advantageously, the report consumer in this example can be more effectively informed that the report has failed and a developer can more effectively determine the basis for the failure, resulting in reduced time to restore functionality.

In some examples, disclosed systems or methods may involve one or more of the following clauses:

Clause 1: A report management device, comprising one or more processors; and memory in communication with the one or more processors and storing instructions that, when executed by the one or more processors, are configured to cause the report management device to: extract a database table name for each of a plurality of database tables identified in a plurality of structured query language (SQL) queries defined in report data maintained in a stored repository, wherein the SQL queries are configured to communicate with one or more stored databases to facilitate generation of a report; analyze each of the SQL queries and report metadata maintained in the stored repository to identify one or more driver tables and one or more required tables of the plurality of database tables, respectively; store the database table names in a table inventory and mark in the table inventory each of the database table names associated with one of the driver tables or one of the required tables as required to be current for report accuracy; for each of the SQL queries comprising a target table, extract one or more elements and one or more source table names for one or more source tables of the target table and store in the table inventory an association of the elements and source table names with a first one of the database table names corresponding to the target table; generate lineage data based on the association in the table inventory when the report was not executed successfully in response to a request to generate the report; and generate and output for display a user interface with a graphical representation of a lineage of the report determined from the lineage data, wherein the graphical representation comprises an indication of a failed table of the plurality of database tables and one or more of the source tables for the failed table.

Clause 2: The report management device of clause 1, wherein the instructions, when executed by the one or more processors, are further configured to cause the report management device to: obtain a report status for the report and a load status for each of the plurality of database tables; determine that the report was not executed successfully based on the report status, and for each of the plurality of database tables for which the load status indicates a failure to load, mark in the table inventory a corresponding second one of the database table names as failed to facilitate generation of the indication of the failed table.

Clause 3: The report management device of clause 1, wherein the table inventory comprises a NoSQL database, the elements correspond to table columns, and the instructions, when executed by the one or more processors, are further configured to cause the report management device to determine the lineage at a table-level and a column-level.

Clause 4: The report management device of clause 1, wherein the instructions, when executed by the one or more processors, are further configured to cause the report management device to: determine that one of the SQL queries has a UNION clause when the one of the SQL queries includes more than one FROM clause; and mark each of a first one of the tables and a second one of the tables associated with the UNION clause as another one of the driver tables.

Clause 5: The report management device of clause 1, wherein the instructions, when executed by the one or more processors, are further configured to cause the report management device to: determine that one of the SQL queries includes a JOIN clause that comprises an INNER, FULL, or SELF JOIN; and mark each of a first one of the tables and a second one of the tables associated with the JOIN clause as another one of the driver tables.

Clause 6: The report management device of clause 1, wherein the instructions, when executed by the one or more processors, are further configured to cause the report management device to: determine that one of the SQL queries includes a JOIN clause that comprises a LEFT or RIGHT JOIN; and select one of a first one of the tables or a second one of the tables associated with the JOIN clause as another one of the driver tables based on one or more characteristics of the LEFT or RIGHT JOIN.

Clause 7: The report management device of clause 1, wherein the instructions, when executed by the one or more processors, are further configured to cause the report management device to output the report via the user interface when the report was generated successfully in response to the request to generate the report.

Clause 8: The report management device of clause 1, wherein the instructions, when executed by the one or more processors, are further configured to cause the report management device to: determine that the failed table is not one of the driver tables or one of the required tables; and output the report via the user interface without generating and outputting the graphical representation of the lineage of the report.

Clause 9: The report management device of clause 1, wherein the instructions, when executed by the one or more processors, are further configured to cause the report management device to output via the user interface a failure message indicating one or more of a cause of a failure of the report to execute successfully or an indication of an estimated restoration time.

Clause 10: The report management device of clause 9, wherein the instructions, when executed by the one or more processors, are further configured to cause the report management device to determine the estimated restoration time based on one or more of the lineage data, input received from a subject matter expert, logged data regarding historical failures, whether the report was not executed successfully due an internal failure, or whether the report was not executed successfully due an external failure.

Clause 11: The report management device of clause 9, wherein the instructions, when executed by the one or more processors, are further configured to cause the report management device to determine whether the cause of the failure comprises an analytics infrastructure failure or a cloud data platform failure associated with the failed table.

Clause 12: A report management device, comprising: one or more processors; and memory in communication with the one or more processors and storing instructions that, when executed by the one or more processors, are configured to cause the report management device to: extract a database table name for each of a plurality of database tables identified in a plurality of structured query language (SQL) queries retrieved from stored report data, wherein the SQL queries facilitate generation of a report; analyze each of the SQL queries and obtained report metadata to identify one or more driver tables and one or more required tables of the plurality of database tables, respectively; store the database table names in a table inventory and mark in the table inventory each of the database table names associated with one of the driver tables or one of the required tables; for each of the SQL queries comprising a target table, extract one or more elements and one or more source table names and store in the table inventory an association of the elements and source table names with one of the database table names corresponding to the target table; generate lineage data based on the association of the elements and source table names with the one of the database table names corresponding to the target table in response to determining that the report was not executed successfully; and generate and output a graphical representation of a lineage of the report determined from the lineage data, wherein the graphical representation comprises an indication of a failed table of the plurality of database tables.

Clause 13: The report management device of clause 12, wherein the instructions, when executed by the one or more processors, are further configured to cause the report management device to: determine that one of the SQL queries has a UNION clause when the one of the SQL queries includes more than one FROM clause; and mark each of a first one of the tables and a second one of the tables associated with the UNION clause as another one of the driver tables.

Clause 14: The report management device of clause 12, wherein the instructions, when executed by the one or more processors, are further configured to cause the report management device to: determine that one of the SQL queries includes a JOIN clause that comprises an INNER, FULL, or SELF JOIN; and mark each of a first one of the tables and a second one of the tables associated with the JOIN clause as another one of the driver tables.

Clause 15: The report management device of clause 12, wherein the instructions, when executed by the one or more processors, are further configured to cause the report management device to: determine that one of the SQL queries includes a JOIN clause that comprises a LEFT or RIGHT JOIN; and select one of a first one of the tables or a second one of the tables associated with the JOIN clause as another one of the driver tables based on one or more characteristics of the LEFT or RIGHT JOIN.

Clause 16: A report management device, comprising: one or more processors; and memory in communication with the one or more processors and storing instructions that, when executed by the one or more processors, are configured to cause the report management device to: extract a database table name for each of a plurality of database tables identified in a plurality of structured query language (SQL) queries that facilitate generation of a report; analyze each of the SQL queries to identify one or more driver tables of the plurality of database tables; mark in a table inventory each of the database table names associated with one of the driver tables; for each of the SQL queries comprising a target table of the plurality of database tables, extract one or more source table names and store in the table inventory an association of the source table names with a first one of the database table names corresponding to the target table; generate lineage data based on the association of the source table names with the first one of the database table names in response to determining that the report was not executed successfully based on an obtained report status for the report; for each of the plurality of database tables for which an obtained load status indicates a failure to load, mark in the table inventory a corresponding second one of the database table names as failed; and output a graphical representation of a lineage of the report determined from the lineage data, wherein the graphical representation comprises an indication of a failed table of the plurality of database tables generated based on the marking in the table inventory of the corresponding second one of the database table names as failed.

Clause 17: The report management device of clause 16, wherein the table inventory comprises a NoSQL database, the elements correspond to table columns, and the instructions, when executed by the one or more processors, are further configured to cause the report management device to determine the lineage at a table-level and a column-level.

Clause 18: The report management device of clause 16, wherein the instructions, when executed by the one or more processors, are further configured to cause the report management device to output via a user interface a failure message indicating one or more of a cause of a failure of the report to execute successfully or an indication of an estimated restoration time.

Clause 19: The report management device of clause 18, wherein the instructions, when executed by the one or more processors, are further configured to cause the report management device to determine the estimated restoration time based on one or more of the lineage data, input received from a subject matter expert, logged data regarding historical failures, whether the report was not executed successfully due an internal failure, or whether the report was not executed successfully due an external failure.

Clause 20: The report management device of clause 18, wherein the instructions, when executed by the one or more processors, are further configured to cause the report management device to determine whether the cause of the failure comprises an analytics infrastructure failure or a cloud data platform failure associated with the failed table.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A report management device, comprising:
   one or more processors; and
   memory in communication with the one or more processors and storing instructions that, when executed by the one or more processors, are configured to cause the report management device to:
      extract a database table name for each of a plurality of database tables identified in a plurality of structured query language (SQL) queries defined in report data maintained in a stored repository, wherein the SQL queries are configured to communicate with one or more stored databases to facilitate generation of a report;
      analyze each of the SQL queries to identify one or more driver tables;
      analyze report metadata maintained in the stored repository to identify one or more required tables of the plurality of database tables;
      store the database table names in a table inventory and mark in the table inventory each of the database table names associated with one of the driver tables or one of the required tables as required to be current for accuracy of the report;
      for each of the SQL queries comprising a target table to which a result of the SQL query is to be inserted, extract one or more elements and one or more source table names for one or more source tables from which source data for the SQL query is to be retrieved and store in the table inventory an association of the elements and source table names with a first one of the database table names corresponding to the target table, wherein the elements correspond to columns of the source tables;
      determine whether a failed table of the plurality of database tables is one of the one or more driver tables or one of the one or more required tables based on the marking in the table inventory, when the report was not executed successfully in response to a request to generate the report;
      generate lineage data based on the association in the table inventory, wherein the lineage data reflects interrelationships of the plurality of database tables utilized to generate the report; and
      generate and output for display a user interface with a graphical representation of the lineage data and an indication of the failed table and one or more of the source tables for the failed table.

2. The report management device of claim 1, wherein the instructions, when executed by the one or more processors, are further configured to cause the report management device to:
   obtain a report status for the report and a load status for each of the plurality of database tables;
   determine that the report was not executed successfully based on the report status, and
   for each of the plurality of database tables for which the load status indicates a failure to load, mark in the table inventory a corresponding second one of the database table names as failed to facilitate generation of the indication of the failed table.

3. The report management device of claim 1, wherein the table inventory comprises a NoSQL database, the elements correspond to table columns, and the instructions, when executed by the one or more processors, are further configured to cause the report management device to determine the lineage at a table-level and a column-level.

4. The report management device of claim 1, wherein the instructions, when executed by the one or more processors, are further configured to cause the report management device to:
   determine that one of the SQL queries has a UNION clause when the one of the SQL queries includes more than one FROM clause; and
   mark each of a first one of the tables and a second one of the tables associated with the UNION clause as another one of the driver tables.

5. The report management device of claim 1, wherein the instructions, when executed by the one or more processors, are further configured to cause the report management device to:
   determine that one of the SQL queries includes a JOIN clause that comprises an INNER, FULL, or SELF JOIN; and
   mark each of a first one of the tables and a second one of the tables associated with the JOIN clause as another one of the driver tables.

6. The report management device of claim 1, wherein the instructions, when executed by the one or more processors, are further configured to cause the report management device to:
   determine that one of the SQL queries includes a JOIN clause that comprises a LEFT or RIGHT JOIN; and
   select one of a first one of the tables or a second one of the tables associated with the JOIN clause as another one of the driver tables based on one or more characteristics of the LEFT or RIGHT JOIN.

7. The report management device of claim 1, wherein the instructions, when executed by the one or more processors, are further configured to cause the report management device to output the report via the user interface when the report was generated successfully in response to the request to generate the report.

8. The report management device of claim 1, wherein the instructions, when executed by the one or more processors, are further configured to cause the report management device to:
   determine that the failed table is not one of the driver tables or one of the required tables; and
   output the report via the user interface without generating and outputting the graphical representation of the lineage of the report.

9. The report management device of claim 1, wherein the instructions, when executed by the one or more processors, are further configured to cause the report management device to output via the user interface a failure message indicating one or more of a cause of a failure of the report to execute successfully or an indication of an estimated restoration time.

10. The report management device of claim 9, wherein the instructions, when executed by the one or more processors, are further configured to cause the report management device to determine the estimated restoration time based on one or more of the lineage data, input received from a subject matter expert, logged data regarding historical failures, whether the report was not executed successfully due an internal failure, or whether the report was not executed successfully due an external failure.

11. The report management device of claim 9, wherein the instructions, when executed by the one or more processors, are further configured to cause the report management device to determine whether the cause of the failure comprises an analytics infrastructure failure or a cloud data platform failure associated with the failed table.

12. A report management device, comprising:
   one or more processors; and
   memory in communication with the one or more processors and storing instructions that, when executed by the one or more processors, are configured to cause the report management device to:
      extract a database table name for each of a plurality of database tables identified in a plurality of structured query language (SQL) queries retrieved from stored report data, wherein the SQL queries facilitate generation of a report;
      analyze each of the SQL queries to identify one or more driver tables;
      analyze report metadata to identify one or more required tables of the plurality of database tables;
         store the database table names in a table inventory and mark in the table inventory each of the database table names associated with one of the driver tables or one of the required tables as required to be current for accuracy of the report;
         for each of the SQL queries comprising a target table to which a result of the SQL query is to be inserted, extract one or more elements and one or more source table names for one or more source tables from which source data for the SQL query is to be retrieved and store in the table inventory an association of the elements and source table names with one of the database table names corresponding to the target table, wherein the elements correspond to columns of the source tables;
      determine whether a failed table of the plurality of database tables is one of the one or more driver tables or one of the one or more required tables based on the marking in the table inventory, when the report was not executed successfully in response to a request to generate the report;
      generate lineage data based on the association of the elements and source table names with the one of the database table names corresponding to the target table, wherein the lineage data reflects interrelationships of the plurality of database tables utilized to generate the report; and
      generate and output a graphical representation of the lineage data and an indication of the failed table.

13. The report management device of claim 12, wherein the instructions, when executed by the one or more processors, are further configured to cause the report management device to:
   determine that one of the SQL queries has a UNION clause when the one of the SQL queries includes more than one FROM clause; and
   mark each of a first one of the tables and a second one of the tables associated with the UNION clause as another one of the driver tables.

14. The report management device of claim 12, wherein the instructions, when executed by the one or more processors, are further configured to cause the report management device to:
   determine that one of the SQL queries includes a JOIN clause that comprises an INNER, FULL, or SELF JOIN; and
   mark each of a first one of the tables and a second one of the tables associated with the JOIN clause as another one of the driver tables.

15. The report management device of claim 12, wherein the instructions, when executed by the one or more processors, are further configured to cause the report management device to:

determine that one of the SQL queries includes a JOIN clause that comprises a LEFT or RIGHT JOIN; and select one of a first one of the tables or a second one of the tables associated with the JOIN clause as another one of the driver tables based on one or more characteristics of the LEFT or RIGHT JOIN.

16. A report management device, comprising:

one or more processors; and memory in communication with the one or more processors and storing instructions that, when executed by the one or more processors, are configured to cause the report management device to:

extract a database table name for each of a plurality of database tables identified in a plurality of structured query language (SQL) queries that facilitate generation of a report;

analyze each of the SQL queries to identify one or more driver tables of the plurality of database tables;

mark in a table inventory each of the database table names associated with one of the driver tables;

for each of the SQL queries comprising a target table to which a result of the SQL query is to be inserted, extract one or more source table names for one or more source tables from which source data for the SQL query is to be retrieved and store in the table inventory an association of the source table names with a first one of the database table names corresponding to the target table;

determine whether a failed table of the plurality of database tables is one of the one or more driver tables based on the marking in the table inventory in response to determining that the report was not executed successfully based on an obtained report status for the report;

generate lineage data based on the association of the source table names with the first one of the database table names, wherein the lineage data reflects interrelationships of the plurality of database tables utilized to generate the report;

and output a graphical representation of the lineage data and an indication of the failed table.

17. The report management device of claim 16, wherein the table inventory comprises a NoSQL database, the elements correspond to table columns, and the instructions, when executed by the one or more processors, are further configured to cause the report management device to determine the lineage at a table-level and a column-level.

18. The report management device of claim 16, wherein the instructions, when executed by the one or more processors, are further configured to cause the report management device to output via a user interface a failure message indicating one or more of a cause of a failure of the report to execute successfully or an indication of an estimated restoration time.

19. The report management device of claim 18, wherein the instructions, when executed by the one or more processors, are further configured to cause the report management device to determine the estimated restoration time based on one or more of the lineage data, input received from a subject matter expert, logged data regarding historical failures, whether the report was not executed successfully due an internal failure, or whether the report was not executed successfully due an external failure.

20. The report management device of claim 18, wherein the instructions, when executed by the one or more processors, are further configured to cause the report management device to determine whether the cause of the failure comprises an analytics infrastructure failure or a cloud data platform failure associated with the failed table.

* * * * *